No. 803,807. PATENTED NOV. 7, 1905.
W. E. BURKS.
CHEESE CUTTER.
APPLICATION FILED OCT. 7, 1904.

2 SHEETS—SHEET 1.

Witnesses

Inventor
W. E. Burks,
By Victor J. Evans
Attorney

No. 803,807. PATENTED NOV. 7, 1905.
W. E. BURKS.
CHEESE CUTTER.
APPLICATION FILED OCT. 7, 1904.
2 SHEETS—SHEET 2.
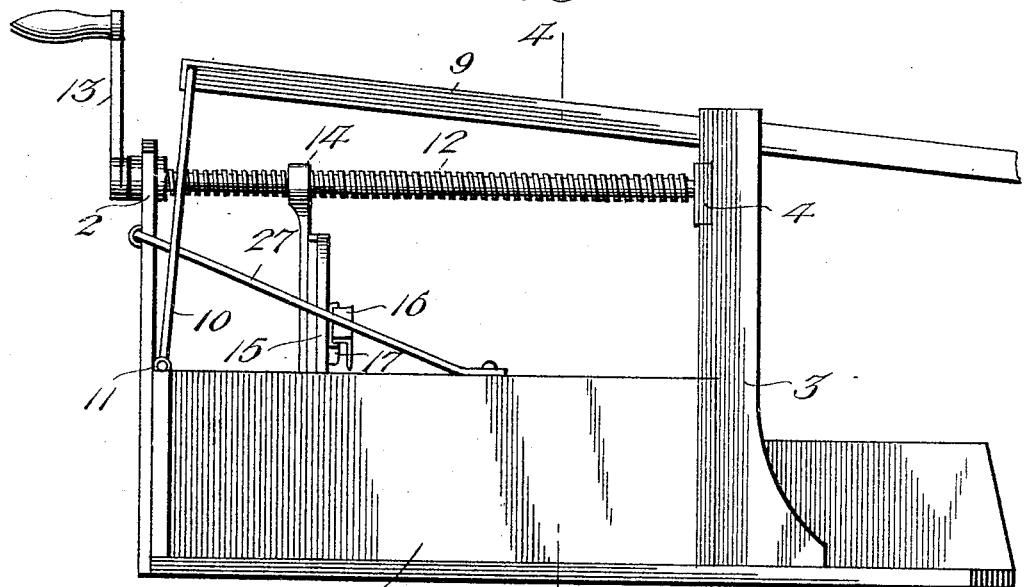
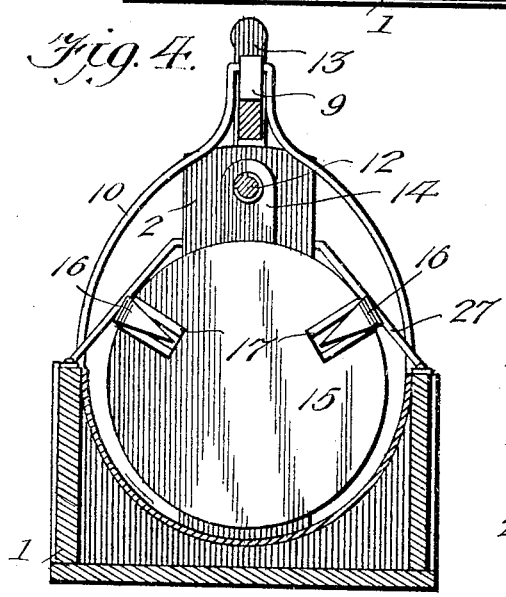
Witnesses
Geo. Uckmann.
F. A. Elmore
Inventor
W. E. Burks,
By Victor J. Evans
Attorney

UNITED STATES PATENT OFFICE.

WILLIAM E. BURKS, OF ASHLAND, KENTUCKY, ASSIGNOR OF ONE-THIRD TO ULYSSES S. PRINCE, OF ASHLAND, KENTUCKY.

CHEESE-CUTTER.

No. 803,807.   Specification of Letters Patent.   Patented Nov. 7, 1905.

Application filed October 7, 1904. Serial No. 227,570.

*To all whom it may concern:*

Be it known that I, WILLIAM E. BURKS, a citizen of the United States, residing at Ashland, in the county of Boyd and State of Kentucky, have invented new and useful Improvements in Cheese-Cutters, of which the following is a specification.

This invention relates to cheese-cutters, and has for its objects to produce a comparatively simple inexpensive device of this character, wherein the cheese may be fed to position beneath the knife for cutting slices of any desired predetermined thickness, and one in which the cheese will be securely clamped at a point adjacent the knife during the cutting operation.

A further object of the invention is to provide a plurality of differently-graduated scales for indicating approximately the weight of the slice of cheese to be cut, these scales being intended for use separately according to the varying sizes of the cheeses acted upon, there being also provided on the device an automatically-operable indicator for disclosing the size of cheese being acted upon and the particular scale which will thereby and for the time being be brought into play.

A further object of the invention is to provide a device in which the cheese-feeding member or plunger will be securely engaged with the cheese to thereby permit of the latter being advanced or retracted for obtaining the proper adjustment beneath the knife.

To these ends the invention comprises the novel features of construction and combination of parts more fully hereinafter described.

Figure 1:
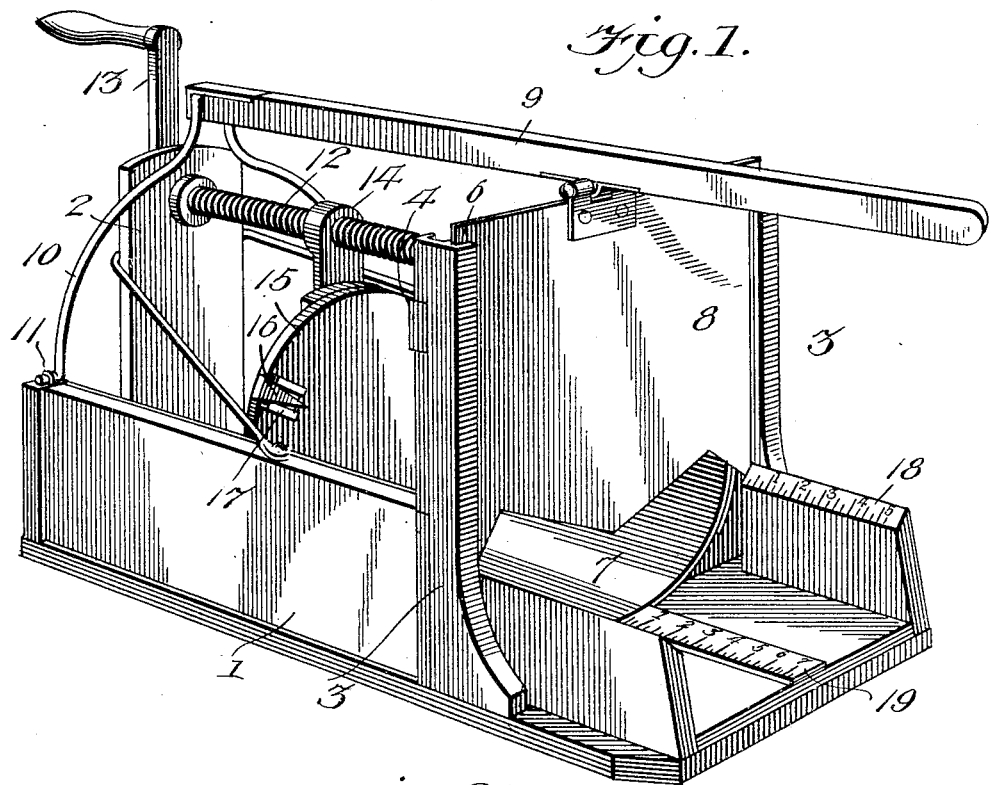
Figure 2:
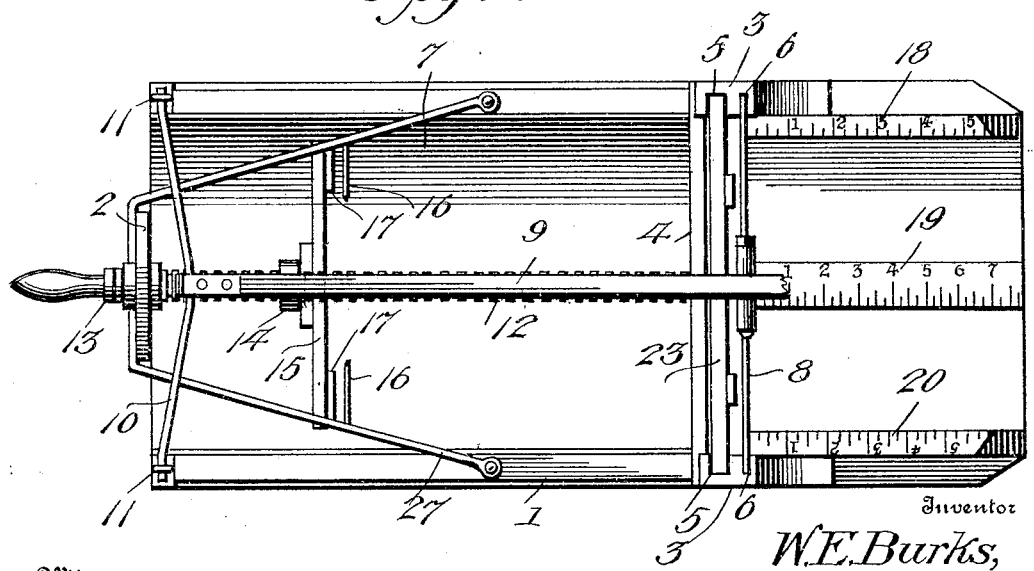

In the accompanying drawings, Figure 1 is a perspective view of a cheese-cutter embodying the invention. Fig. 2 is a top plan view of the same. Fig. 3 is a side elevation. Fig. 4 is a vertical transverse sectional elevation taken on the line 4 4 of Fig. 3. Fig. 5 is a front elevation, partly in section, and with the cutting-blade removed to expose other parts to view.

Referring to the drawings, 1 designates a supporting bed or frame provided at its rear end with a vertically-uprising post or standard 2 and adjacent its forward end with an oppositely-disposed pair of vertical posts or standards 3, connected near their upper ends by a horizontal bar or member 4, and having on their inner faces primary vertical guideways or grooves 5 and secondary vertical guideways or grooves 6, the pairs of guideways 5 and 6 being oppositely disposed.

Sustained within the frame 1 is a preferably sheet-metal cheese-receptacle 7 of semicircular form in cross-section and terminated at its forward end substantially in line with the guideways 6, which receive a vertically reciprocatory cutting knife or blade 8, designed to work close to the forward end of the receptacle and operable by means of a hand-lever 9, to which it is pivoted, and which in turn is pivoted at its rear end to a substantially semicircular bail or link 10, having the lower ends of its arms pivotally connected, as at 11, with the supporting-frame.

Extended horizontally between and journaled at its ends in the standard 2 and bar 4 is a feed member or screw 12, to the rear end of which is fixed an operating member or crank 13 and on which there is disposed for travel a member or hanger 14, carrying a pressure device or head 15, which in practice bears upon the rear end of a cheese arranged within the receptacle 7, there being disposed upon the front face of the head 15 a plurality of sharpened engaging members or spurs 16, slidably and removably mounted in flanged guide-clips 17, fixed upon the head, these engaging members being adapted in practice for entrance into the cheese for attaching the latter to the head 15, whereby the cheese may be advanced or retracted with the head for proper adjustment beneath the blade 8.

The frame 1 is prolonged or extended in front of the receptacle 7 and knife 8, and on this extended portion there is provided a plurality, of (preferably three,) scales 18, 19, and 20, the graduations of which differ from one another, the purpose of these scales being to determine the thickness, and consequently the weight, of the slice to be cut, while upon the forward end of the receptacle 7 there is mounted a pair of oppositely-disposed and coöperating clamping members or bands 21, provided at their free meeting ends with reversely-inclined and upwardly-convergent portions or blocks 22, adapted to register with and enter a recess or seat 23, formed in the lower edge of a sliding member or plate 24, arranged for vertical reciprocation in the guideways 5, the side walls of the recess 23 being inclined coincidently with the adjacent outer faces of the blocks 22, whereby as the plate 24 moves downward and the blocks enter the recess the ends of the bands 21 will be brought together and the bands caused to securely clamp the adjacent forward end of the cheese. The plate 24 is suitably weighted to move downward automatically by gravity and carries on its front face an indicator or indicators 25, preferably in the form of flat plates, which project an appropriate distance above the upper edge of the plate 24, and each having upon its front face a plurality of spaces or sections 26, contrastingly colored and corresponding in number to the number of scales 18 to 20, which are likewise contrastingly colored to correspond, respectively, with the various colored portions or sections of the indicators for a purpose which will presently appear.

The standard 2 has engaged therewith adjacent to its upper end a substantially U-shaped bracing member or strap 27, the ends of which are attached to the frame 1, this strap serving to thoroughly brace and strengthen the standard for withstanding any strains to which it may in practice be subjected.

In the operation of the device a cheese is placed in the receptacle 7 and engaged with the head 15 by removing the engaging members or spurs 16 from their retaining-sockets and entering them into the cheese and again into the sockets. The blade 8 is then appropriately lifted by means of the lever 9 and the crank 13 operated for feeding head 15 forwardly upon the screw, thereby advancing the cheese beneath the knife, and after the cheese has been appropriately adjusted the knife is brought into action for cutting a slice therefrom. In adjusting the cheese one or other of the scales 18, &c., is consulted to approximate the amount of cheese to be cut, the scale brought into play for this purpose being determined by the size of the cheese, it being apparent that when a cheese of small diameter is being acted upon the blocks 22 will enter wholly within the recess, thereby permitting complete descent of the plate 24, whereupon the uppermost section 26 of the indicator will be alone visible above the upper edge of the knife 8, and the color thus displayed will correspond with that of one of the scales—for instance, 18—which for the time being is brought into play. When, however, a cheese of larger diameter is being acted upon, the blocks 22 fail to fully enter the recess and complete descent of the plate 24 is obviated, thus displaying above the knife 8 a second section of the indicator corresponding in color to that of the scale 20, which latter will therefore be employed in determining the cuts made upon the cheese, while a still larger cheese brings into play in like manner the scale 19. A slice having been severed from the cheese, the blade 8 is permitted to rest in its depressed or lowered position to thus protect the adjacent end of the cheese during the interval before again cutting the latter.

From the foregoing it is apparent that I produce a simple, efficient device which in practice will admirably perform its functions to the attainment of the ends in view, it being understood that minor changes in the details herein set forth may be resorted to without departing from the spirit of the invention.

Having thus fully described the invention, what is claimed as new is—

1. In a cheese-cutter, a frame including a cheese-receptacle, an operating-screw journaled in the frame above the receptacle, an operating-crank carried at one end of the screw, a pressure-head operatively engaged with the screw for movement back and forth longitudinally of the receptacle, guides provided at the forward end of the receptacle, a cutting-blade slidably arranged in the guides to intersect the receptacle, an operating-lever pivotally connected with the blade, and a bail pivoted to the lever and the frame.

2. In a cheese-cutter, a cutting member, means for advancing a cheese beneath the cutter, a plurality of graduated scales designed to enter into play severally for determining the advance of the cheese beneath the cutter, and devices automatically controlled by the size of the cheese for indicating the scale to be brought into play.

3. In a cheese-cutter, a cheese-receptacle, a cutting member, means for advancing a cheese in the receptacle, a plurality of scales designed to be brought into play severally for determining the advance of the cheese, a pair of clamping members for partly embracing the cheese, and devices controlled by the contraction and expansion of the clamping members for indicating the particular scale to be brought into play.

4. In a cheese-cutter, a movable cutting-blade, a pair of clamping members designed to partly embrace a cheese and provided with inclined portions, a plurality of scales adapted to be brought into play severally for determining the adjustment of the cheese beneath the cutter, and a movable member acting in conjunction with the inclined portions of the clamping members for indicating the particular scale to be brought into play.

In testimony whereof I affix my signature in presence of two witnesses.

WILLIAM E. BURKS.

Witnesses:
 ROSE RUGGLES,
 JOHN S. HAGER.